United States Patent
Ahmadian Tehrani et al.

(10) Patent No.: US 12,531,698 B2
(45) Date of Patent: Jan. 20, 2026

(54) CORESET SELECTION WITH DIFFERENT QCL-TYPED FOR M-TRP PDCCH REPETITION

(71) Applicant: Nokia Technologies Oy, Espoo (FI)

(72) Inventors: Amir Mehdi Ahmadian Tehrani, Munich (DE); Keeth Saliya Jayasinghe Laddu, Espoo (FI); Matha Deghel, Paris (FR); Youngsoo Yuk, Seoul (KR)

(73) Assignee: Nokia Technologies Oy, Espoo (FI)

( * ) Notice: Subject to any disclaimer, the term of this patent is extended or adjusted under 35 U.S.C. 154(b) by 385 days.

(21) Appl. No.: 17/869,343

(22) Filed: Jul. 20, 2022

(65) Prior Publication Data

US 2023/0042071 A1  Feb. 9, 2023

Related U.S. Application Data

(60) Provisional application No. 63/230,112, filed on Aug. 6, 2021.

(51) Int. Cl.
*H04L 5/00* (2006.01)
*H04W 72/23* (2023.01)

(52) U.S. Cl.
CPC ......... *H04L 5/0053* (2013.01); *H04W 72/23* (2023.01)

(58) Field of Classification Search
CPC .... H04L 5/0023; H04L 5/0053; H04W 72/23; H04B 7/0695
See application file for complete search history.

(56) References Cited

U.S. PATENT DOCUMENTS

| | | |
|---|---|---|
| 2021/0022167 A1 | 1/2021 | Khoshnevisan et al. |
| 2021/0050936 A1 | 2/2021 | Seo et al. |
| 2021/0195601 A1 | 6/2021 | Khoshnevisan et al. |
| 2021/0307050 A1* | 9/2021 | Khoshnevisan ...... H04L 5/0055 |
| 2022/0124782 A1* | 4/2022 | Park ...................... H04W 72/23 |
| 2022/0174681 A1* | 6/2022 | Gao .................... H04W 72/563 |
| 2022/0217621 A1* | 7/2022 | Papasakellariou .... H04W 72/23 |

(Continued)

FOREIGN PATENT DOCUMENTS

| | | |
|---|---|---|
| WO | 2018/060759 A1 | 4/2018 |
| WO | WO 2019/244223 A1 | 12/2019 |

(Continued)

OTHER PUBLICATIONS

"3rd Generation Partnership Project; Technical Specification Group Radio Access Network; NR; Physical layer procedures for control (Release 16)", 3GPP TS 38.213, V16.6.0, Jun. 2021, pp. 1-187.

(Continued)

*Primary Examiner* — Sulaiman Nooristany
(74) *Attorney, Agent, or Firm* — McCarter & English, LLP

(57) ABSTRACT

In accordance with example embodiments of the invention there is at least a method and apparatus to perform determining, by a network device of a communication network, that to monitor physical downlink control channel candidates of two or more control resource sets of the communication network, wherein the two or more control resource sets are using different QCL-TypeD; and selecting at least two control resource sets of the two or more control resource sets with different QCL-TypeD for monitoring at least two of the physical downlink control channel candidates.

17 Claims, 6 Drawing Sheets

---

710: determining, by a network device of a communication network, to monitor physical downlink control channel candidates of two or more control resource sets of the communication network, wherein the two or more control resource sets are using different QCL-TypeD identifiers 720: selecting at least two control resource sets of the two or more control resource sets with different QCL-TypeD identifiers for monitoring at least two of the physical downlink control channel candidates

(56) References Cited

U.S. PATENT DOCUMENTS

2022/0217694 A1* 7/2022 Kim ...................... H04L 1/1864
2024/0089061 A1* 3/2024 Gao ...................... H04L 5/0098

FOREIGN PATENT DOCUMENTS

| WO | 2020/063563 A1 | 4/2020 |
| WO | 2020/165702 A1 | 8/2020 |
| WO | 2021/022736 A1 | 2/2021 |
| WO | 2021/126705 A1 | 6/2021 |

OTHER PUBLICATIONS

"New WID: Further enhancements on MIMO for NR", 3GPP TSG RAN Meeting #86, RP-193133, Agenda: 9.1.1, Samsung, Dec. 9-12, 2019, 5 pages.
Takeda et al., "Understanding the Heart of the 5G Air Interface: An Overview of Physical Downlink Control Channel for 5G New Radio", IEEE Communications Standards Magazine, vol. 4, No. 3, Sep. 2020, pp. 22-29.
"Summary #1 of email discussions [104b-e-NR-feMIMO-02] for mTRP PDCCH enhancements", 3GPP TSG-RAN WG1 Meeting #104-bis-e, R1-2103819, Agenda: 8.1.2.1, Qualcomm, Apr. 12-20, 2021, 54 pages.
"Summary #2 of email discussions [104b-e-NR-feMIMO-02] for mTRP PDCCH enhancements", 3GPP TSG-RAN WG1 Meeting #104-bis-e, R1-2103820, Agenda: 8.1.2.1, Qualcomm, Apr. 12-20, 2021, 21 pages.
"Summary #3 of email discussions [104b-e-NR-feMIMO-02] for mTRP PDCCH enhancements", 3GPP TSG-RAN WG1 Meeting #104-bis-e, R1-2103915, Agenda: 8.1.2.1, Qualcomm, Apr. 12-20, 2021, 15 pages.
"Maintenance of Rel-16 Multi-TRP operation", 3GPP TSG RAN WG1 Meeting #103-e, R1-2008723, Agenda: 7.2.6, Nokia, Oct. 26-Nov. 13, 2020, 2 pages.
"Corrections to multi TRP", 3GPP TSG RAN WG1 #103-e, R1-2007938, Agenda: 7.2.6, Intel Corporation, Oct. 26-Nov. 13, 2020, 2 pages.
International Search Report and Written Opinion received for corresponding Patent Cooperation Treaty Application No. PCT/EP2022/069404, dated Oct. 17, 2022, 12 pages.
"On Multi-TRP Reliability Enhancement", 3GPP TSG-RAN WG1 Meeting #105-e, R1-2105088, Agenda: 8.1.2.1, Apple Inc, May 10-27, 2021, 12 pages.
"Discussion on enhancements on beam management for multi-TRP", 3GPP TSG RAN WG1 #104-e, R1-2100786, Agenda: 8.1.2.3, Spreadtrum Communications, Jan. 25-Feb. 5, 2021, 6 pages.
Spreadtrum Communications, Discussion on enhancements on beam management for multi-TRP, 3GPP TSG RAN WG1 #104b-e R1-2102444, Internet URL: https://www.3gpp.org/ftp/tsg_ran/WG1_RL1/TSGR1_104b-e/Docs/R1-2102444.zip, Apr. 7, 2021.
Apple Inc., On Multi-TRP Reliability Enhancement, 3GPP TSG RAN WG1 #104b-e R1-2103089, Internet URL: https://www.3gpp.org/ftp/tsg_ran/WG1_RL1/TSGR1_104b-e/Docs/R1-2103089.zip, Apr. 7, 2021.
Nokia, Nokia Shanghai Bell, Enhancements for Multi-TRP URLLC schemes, 3GPP TSG RAN WG1 #106-e R1-2108053, Internet URL: https://www.3gpp.org/ftp/tsg_ran/WG1_RL1/TSGR1_106-e/Docs/R1-2108053.zip, Aug. 6, 2021.
Moderator (Qualcomm), Summary #3 of email discussions [104b-e-NR-feMIMO-02] for mTRP PDCCH enhancements, 3GPP TSG RAN WG1 #104b-e R1-2103915, Internet URL: https://www.3gpp.org/ftp/tsg_ran/WG1_RL1/TSGR1_104b-e/Docs/R1-2103915.zip, Apr. 17, 2021.
Examiner's Tentative Rejection for corresponding Taiwan Patent Application No. 111129187, dated May 26, 2023, 15 pages of office action and no page of translation available.
"Moderator summary #4 on M-TRP simultaneous transmission with multiple Rx panels", 3GPP TSG RAN WG1 #105-e, R1-2106287, Agenda: 8.1.2.3, CATT, May 10-27, 2021, 49 pages.
Office action received for corresponding Bangladesh Patent Application No. 264/2022, dated Aug. 19, 2024, 1 page.
"3rd Generation Partnership Project; Technical Specification Group Radio Access Network; NR; Physical layer procedures for control (Release 17)", 3GPP TS 38.213, V17.2.0, Jun. 2022, pp. 1-256.

* cited by examiner

CORESET SELECTION WITH DIFFERENT QCL-TYPED FOR M-TRP PDCCH REPETITION

RELATED APPLICATION

This application claims priority to U.S. Provisional Application No. 63/230,112 filed Aug. 6, 2021 which is incorporated herein by reference in its entirety.

TECHNICAL FIELD

The teachings in accordance with the exemplary embodiments of this invention relate generally to determining CORESETs to monitor for physical resources and, more specifically, relate to determining CORESETs with different QCL-TypeDs using PDCCH repetitions for monitoring physical resources.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:

| | |
|---|---|
| AL | Aggregation Level |
| BD | Blind Decoding |
| CORESET | Control Resource Set |
| CSS | Common Search Space |
| DCI | Downlink Control Information |
| gNB | 5G Node B |
| MAC CE | MAC Control Element |
| M-TRP | Multi Transmission and Reception Point |
| OFDM | Orthogonal Frequency-Division Multiplexing |
| PDCCH | Physical Downlink Control Channel |
| PDSCH | Physical Downlink Shared Channel |
| QCL | Quasi Co-Location |
| SS | Search Space |
| SSSet | Search Space Set |
| TCI | Transmission Configuration Indicator |
| TRP | Transmission and Reception Point |
| UE | User Equipment |
| USS | UE-Specific Search Space |

At the time of this application, as the demand for radio access continues to increase, there exists a need for further improvements in different aspects of communication systems including improving data rate, latency, reliability, and/or mobility for wireless communication for cellular wireless communication systems, such as for 5G NR. Such improvements relate to control resource set selection operations for such communications.

Example embodiments of the invention work to further improve such operations.

SUMMARY

In an example aspect of the invention, there is an apparatus comprising: at least one processor; and at least one non-transitory memory including computer program code, where the at least one non-transitory memory and the computer program code are configured, with the at least one processor, to cause the apparatus to at least: determine to monitor physical downlink control channel candidates of two or more control resource sets of the communication network, wherein the two or more control resource sets are using different QCL-TypeD; and select at least two control resource sets of the two or more control resource sets with different QCL-TypeDs for monitoring at least two of the physical downlink control channel candidates.

In another example aspect of the invention, there is a method comprising: determining, by a network device of a communication network, to monitor physical downlink control channel candidates of two or more control resource sets of the communication network, wherein the two or more control resource sets are using different QCL-TypeD; and selecting at least two control resource sets of the two or more control resource sets with different QCL-TypeDs for monitoring at least two of the physical downlink control channel candidates.

A further example embodiment is an apparatus and a method comprising the apparatus and the method of the previous paragraphs, wherein the selecting comprises selecting at least two control resource sets with different QCL-TypeD associated with physical downlink control channel repetitions, wherein the two or more control resource sets comprises at least a first control resource set and at least one other control resource set, wherein the selecting further comprises: selecting the first control resource set and the at least one other control resource set of the two or more control resource sets for monitoring based on a linking between the first control resource set and the at least one other control resource set, wherein the linking between the first control resource set and the at least one other control resource set comprises search space sets of the first control resource set and the at least one other control resource set being linked, wherein the monitoring comprises monitoring physical downlink control channel candidates of the at least one other control resource set associated with a second QCL-TypeD, wherein the monitoring is extended to monitor any control resource set of the at least one other control resource set having the same QCL-TypeD as the second QCL-TypeD, wherein the monitoring is not performed on control resource sets of the two or more control resource sets which are not linked with the first control resource set, wherein based on there being more than two control resource sets having linked search space sets the selecting comprises selecting linked control resource sets with one of lowest or highest indexes, wherein a priority is given for monitoring control resource sets allowing physical downlink control channel repetition that is not based on at least one of common search space or UE-Specific Search Space indexes, wherein based on more than one cell being configured with physical downlink control channel repetition the selecting comprises linked control resource sets in a cell with one of lower or higher indexes, wherein the monitoring comprises monitoring the different QCL-TypeD from different control resource sets of the two or more control resource sets without consideration of whether the different control resource sets are linked to each other, wherein the selecting comprises selecting a first control resource set with a first QCL-TypeD and selecting a second control resource set with a different QCL-TypeD based on control resource sets not associated with the first QCL-TypeD, wherein the selecting is using restrictions to support at least one of physical downlink control channel repetition or multi-transmission and reception point operations, and/or, wherein the restrictions are considering control resource sets with a different coreset pool index associated with a control resource set group defined to support multi-downlink-control-information mode.

In another example aspect of the invention, there is a non-transitory computer-readable medium storing program code, the program code executed by at least one processor to perform at least the method as described in the paragraphs above.

In another example aspect of the invention, there is an apparatus comprising: means for determining to monitor physical downlink control channel candidates of two or more control resource sets of the communication network, wherein the two or more control resource sets are using different QCL-TypeD; and means for selecting at least two control resource sets of the two or more control resource sets with different QCL-TypeDs for monitoring at least two of the physical downlink control channel candidates.

In accordance with the example embodiments as described in the paragraph above, at least the means for determining and selecting comprises a network interface, and computer program code stored on a computer-readable medium and executed by at least one processor.

In another example aspect of the invention, there is a communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In example embodiments of the invention there is at least a method and apparatus to perform determining CORESETs with different QCL-TypeDs using PDCCH repetition for monitoring physical resources.

Example embodiments of the invention can relate to 3GPP New Radio (NR) physical layer design. More specifically, we focus on facilitating physical downlink control channel (PDCCH) candidates Search Space Sets (SSSets) linking when repetition and beam diversity for PDCCH transmissions is applied.

From the physical layer perspective, the data and signalling messages in NR are carried in the downlink (DL) and uplink (UL) physical channels. Among these channels, the PDCCH plays a central role in, for example, DL scheduling assignments, UL scheduling grants. The PDCCH in NR carries Downlink Control Information (DCI). DCI contains the scheduling information for the UL or DL data channels and other control information for one UE or a group of UEs.

PDCCH:

Channel Coding and Downlink Control Information (DCI) Construction.

Figure 1:
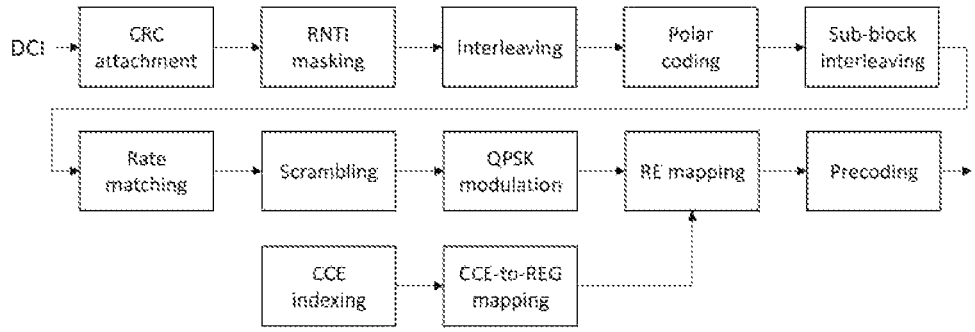
FIG. 1 shows a procedure for generating PDCCH from DCI.

The procedure for generating a PDCCH is illustrated in FIG. 1. If the size of the DCI format is less than 12 bits, a few zero padding bits will be appended until the payload size equals 12 bits. For the DCI payload bits, a 24-bit cyclic redundancy check (CRC) is calculated and appended to the payload. The CRC allows the UE to detect the presence of errors in the decoded DCI payload bits. After the CRC is attached, the last 16 CRC bits are masked with a corresponding identifier, referred to as a radio network temporary identifier (RNTI). Using the RNTI mask, the UE can detect the DCI for its unicast data and distinguish sets of DCI with different purposes that have the same payload size. The CRC attached bits are then interleaved to distribute the CRC bits among the information bits. The interleaver supports a maximum input size of 164 bits. This means that DCI without CRC can have at most 140 of payload bits. The bits are then encoded by the Polar encoder to protect the DCI against errors during transmission. The encoder output is processed using a sub-block interleaver and then rate matched to fit the allocated payload resource elements (REs) of the DCI.

The payload bits of each DCI are separately scrambled by a scrambling sequence generated from the length-31 Gold sequence. The scrambling sequence is initialized by the physical layer cell identity of the cell or by a UE specific scrambling identity and a UE specific cell RNTI(C-RNTI). After the scrambled DCI bit sequence is Quadrature Phase Shift Keying (QPSK) modulated, the complex-valued modulation symbols are mapped to physical resources in units referred to as control channel elements (CCEs). Each CCE consists of six resource element groups (REGs), where a REG is defined as one PRB in one OFDM symbol which contains nine REs for the PDCCH payload and three demodulation reference signal (DMRS) REs. For each DCI, 1, 2, 4, 8, or 16 CCEs can be allocated, where the number of CCEs for a DCI is denoted as aggregation level (AL). With QPSK modulation, a CCE contains 54 payload REs and therefore can carry 108 bits. This requires the output size of the rate matching block to be L-108, where L is the associated AL. Based on the channel environment and available resources, the gNB can adaptively choose a proper AL for a DCI to adjust the code rate.

Control Resource Sets (CORESETs)

A DCI with AL L is mapped to physical resources in a given BWP, where necessary parameters such as frequency and time-domain resources, and scrambling sequence identity for the DMRS for the PDCCH are configured to a UE by means of control resource set (CORESET). A UE may be configured with up to three CORESETs in Rel15 and up to five CORESETs in Rel16 (for multi-DCI M-TRP operation) on each of up to four BWPs on a serving cell. In general, CORESETs are configured in units of six PRBs on a six PRB frequency grid and one, two, or three consecutive OFDM symbols in the time domain.

A DCI of AL L comprises L continuously numbered CCEs, and the CCEs are mapped on a number of REGs in a CORESET. NR supports distributed and localized resource allocation for a DCI in a CORESET. This is done by configuring interleaved or non-interleaved CCE-to-REG mapping for each CORESET. For interleaved CCE-to-REG mapping, REG bundles constituting the CCEs for a PDCCH are distributed in the frequency domain in units of REG bundles. A REG bundle is a set of indivisible resources consisting of neighboring REGs. A REG bundle spans across all OFDM symbols for the given CORESET. Once the REGs corresponding to a PDCCH are determined, the modulated symbols of the PDCCH are mapped to the REs of the determined REGs in the frequency domain first and the time domain second, i.e. in increasing order of the RE index and symbol index, respectively.

PDCCH Monitoring—Search Space Sets (SSSets)

The UE performs blind decoding for a set of PDCCH candidates. PDCCH candidates to be monitored are configured for a UE by means of search space (SS)sets. There are two SS set types: common SS (CSS) set, which is commonly monitored by a group of UEs in the cell, and UE-specific SS (USS) set, which is monitored by an individual UE. A UE can be configured with up to 10 SS sets each for up to four BWPs in a serving cell. In general, SS set configuration provides a UE with the SS set type (CSS set or USS set), DCI format(s) to be monitored, monitoring occasion, and the number of PDCCH candidates for each AL in the SS set.

A SS set with index s is associated with only one CORESET with index p. The UE determines the slot for monitoring the SS set with indexes based on the higher layer parameters for periodicity k, offset o, and duration d, where periodicity k and offset o provide a starting slot and duration dprovides the number of consecutive slots where the SS set is monitored starting from the slot identified by k and o.

PDCCH Repetition Framework

As agreed in RAN1 #103-e, for PDCCH repetition and reliability enhancements with non-SFN schemes and Option 2+Case 1, support Alt3 (two SS sets associated with corresponding CORESETs).

Where Alt3 refers to as considering two (or more) SS sets corresponding to different CORESETs, option 2 refers to as using the same DCI going into encoding process and repeating one in 2 different PDCCH candidate (one per TCI state) and Case 1 refers to as explicit linking between two PDCCH.

In Rel-17 M-TRP PDCCH repetition, two PDCCH candidates (transmitted via different TRPs, or more generally with different TCI states) are associated with each other. The UE knows the association or linkage between two PDCCH candidates before attempting blind decoding such that the UE can perform selective or soft combined decoding without any ambiguity. These associated PDCCH candidates are configured in different SS sets that are associated with corresponding CORESETs (mentioned in working assumptions as disclosed herein).

It is noted that for configuring QCL, TCI-State is a parameter that can be used to configure the quasi co-location relationship between one or two downlink reference signals and the DMRS of the PDSCH port.

Moreover, it was also agreed that the linking of SS sets is based on RRC configurations. When the linking is configured to the UE, gNB shall also follow certain RRC configuration restrictions such as two SS sets have the same periodicity, same DCI formats to monitor, same number of candidates for each aggregation level, and other. Also, the two SS sets are associated with different CORESETs having corresponding TCI states. It is noted TCI can be of a field in DCI used to indicate the quasi co-location of a PDSCH antenna.

For monitoring occasions, it was also agreed that each monitoring occasion of the first SS set is linked with a monitoring occasion of the second SS set. Within two linked monitoring occasions, the PDCCH candidates with the same aggregation level and same candidate index are linked to each other.

More importantly, the benefits of PDCCH repetition, mainly reliability and robustness, can be obtained only when both PDCCH repetitions are decoded with selective or soft-combined decoding approaches at the UE.

PDCCH Reception Priority Rule Assignment

In Rel-15/Rel-16, a priority rule for PDCCH reception is defined when QCL-TypeD collision happens, which is based on the type of SS or CORESET ID. QCL types are defined, for example, in Rel-15/Rel-16, QCL-TypeD is a QCL type associated with one or more spatial receiver parameters. PDCCH reception via CORESET overlapping where different QCL-TypeDs are mapped to different beams and the UE is not able to monitor both since the UE is assumed to be capable of monitoring via single panel and single beam. Thus, the other PDCCH candidate in this case will be dropped.

It is noted that for PDCCH reception, the control resource sets (CORESETs) are defined. These CORESETs collect physical layer parameters related to the detection of the PDCCH, such as the number of OFDM symbols (1, 2, or 3) and the configured frequency resources. Each CORESET thus contains PDCCH candidates and is configured with a TCI state, so if the UE receives a PDCCH, the PDCCH DM-RS is QCL with the source RS as indicated by the TCI state of the CORESET for which the PDCCH belongs. Further, a UE can be configured with more than one CORESET for example configuring a CORESET per transmission point or beam, each with a different and unique TCI state.

A possible source RS for a TCI state that is used for PDCCH is an SSB; hence each SSB used in the cell is configured with a unique TCI state and when the UE moves around in the cell, MAC CE signaling is used to update the TCI state for the configured CORESET. Since a cell in NR can have multiple SSBs (as opposed to the single PSS/SSS/PBCH per cell in LTE), the MAC CE reconfiguration of the active TCI state for a CORESET can be viewed as an intra-cell handover command, except without higher-layer (Layer 3) involvement.

According to 3GPP specifications at the time of this application a rule to prioritize PDCCH candidate from overlapping CORESETs such as when they have different QCL-TypeD properties is as follows:

"If a UE
  is configured for single cell operation or for operation with carrier aggregation in a same frequency band, and
  monitors PDCCH candidates in overlapping PDCCH monitoring occasions in multiple CORESETs that have same or different QCL-TypeD properties on active DL BWP(s) of one or more cells the UE monitors PDCCHs only in a CORESET, and in any other CORESET from the multiple CORESETs having same QCL-TypeD properties as the CORESET, on the active DL BWP of a cell from the one or more cells the CORESET corresponds to the CSS set with the lowest index in the cell with the lowest index containing CSS, if any; otherwise, to the USS set with the lowest index in the cell with lowest index the lowest USS set index is determined over all USS sets with at least one PDCCH candidate in overlapping PDCCH monitoring occasions"

As such, the existing QCL-TypeD prioritization rules across CORESETs result in only one QCL-TypeD to be monitored, which basically excludes the FDM (with time domain only overlapping symbols) PDCCH repetition in FR2 even for UEs that support receiving two beams simultaneously.

Current 3GPP Situation

3GPP Rel17 M-TRP URLLC enhancement WI is targeting to support multi-TRP operation where the UE will be able to receive PDCCH repetitions with different QCL-TypeD. In this context, the following agreement was made during RAN1 #104-bis-e to support PDCCH repetition in FR2 in an FDM manner:

Agreement

For a UE supporting reception with two different beams, support identifying two QCL-TypeD properties for multiple overlapping CORESETs FFS: How to enhance existing QCL-TypeD priority rules for overlapping CORESETs Note: The primary goal of this enhancement for the purpose of this sub-AI is to support time-overlapping PDCCH repetitions in FR2.

To Allow FDM PDCCH repetition, we consider monitoring of multiple overlapping CORESET/PDCCH candidates with differ QCL-TypeD.

There is a limitation for monitoring two PDCCH candidates from different TRPs if there are overlapping CORESETs and they have different QCL-TypeD properties. As shown below a certain rule is applied to prioritize monitoring of PDCCH candidates:

"If a UE is configured for single cell operation or for operation with carrier aggregation in a same frequency band, and monitors PDCCH candidates in overlapping PDCCH monitoring occasions in multiple CORESETs that have same or different QCL-TypeD properties on active DL BWP(s) of one or more cells the UE monitors PDCCHs only in a CORESET, and in any other CORESET from the multiple CORESETs having same QCL-TypeD properties as the CORESET, on the active DL BWP of a cell from the one or more cells the CORESET corresponds to the CSS set with the lowest index in the cell with the lowest index containing CSS, if any; otherwise, to the USS set with the lowest index in the cell with lowest index the lowest USS set index is determined over all USS sets with at least one PDCCH candidate in overlapping PDCCH monitoring occasions"

If the same rule is applied when PDCCH repetition is allowed in overlapping CORESETs, the second PDCCH candidate will not be monitored. As such, using the existing rule leads to not considering the second linked PDCCH candidate. Hence, to enable PDCCH repetition considering overlapping CORESETs, enhancing priority rules is required.

As a summary, the CORESET selection with different QCL-TypeD in case of receiving 2 different beams at the UE is required to be specified and explained how to support PDCCH repetition for the UE which supports receiving of different QCL-TypeD.

Details of how the NR PDCCH operation is working is summarized herein.

Moreover, to drive CORESET from monitoring, one way is to drive CORESET corresponding to CSS with lowest index in the cell or lowest index containing CSS. Thus, it will be linking to a linked CORESET which will be monitored.

However, the state-of-the-art has not addressed monitoring overlapping CORESETs with different QCL-TypeD when reception of PDCCH repetition is applied to UE with multiple panels.

Figure 6:
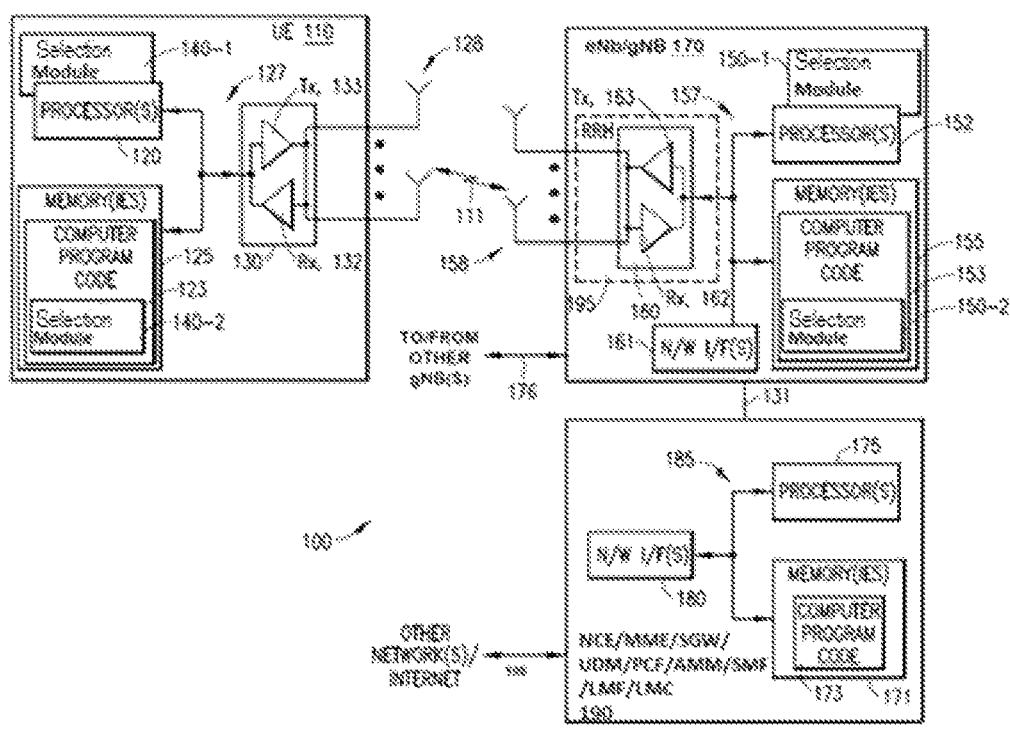
FIG. 6 shows a high level block diagram of various devices used in carrying out various aspects of the invention.

Before describing the example embodiments of the invention in further detail reference is made to FIG. 6. FIG. 6 shows a block diagram of one possible and non-limiting exemplary system in which the exemplary embodiments may be practiced.

As shown in FIG. 6, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include a Selection Module 140 which is configured to perform the example embodiments of the invention as described herein. The Selection Module 140 may be implemented in hardware by itself of as part of the processors and/or the computer program code of the UE 110. The Selection Module 140 comprising one of or both parts 140-1 and/or 140-2, which may be implemented in a number of ways. The Selection Module 140 may be implemented in hardware as Selection Module 140-1, such as being implemented as part of the one or more processors 120. The Selection Module 140-1 may be implemented also as an integrated circuit or through other hardware such as a programmable gate array. In another example, the Selection Module 140 may be implemented as Selection Module 140-2, which is implemented as computer program code 123 and is executed by the one or more processors 120. Further, it is noted that the Selection Modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a Selection Module 150 which is configured to perform example embodiments of the invention as described herein. The Selection Module 150 may comprise one of or both parts 150-1 and/or 150-2, which may be implemented in a number of ways. The Selection Module 150 may be implemented in hardware by itself or as part of the processors and/or the computer program code of the gNB 170. Selection Module 150-1, such as being implemented as part of the one or more processors 152. The Selection Module 150-1 may be implemented also as an integrated circuit or through other hardware such as a programmable gate array. In another example, the Selection Module 150 may be implemented as Selection Module 150-2, which is implemented as computer program code 153 and is executed by the one or more processors 152. Further, it is noted that the Selection Modules 150-1 and/or 150-2 are optional. For instance, the one or more memories 155 and the computer program code 153 may be configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a NCE/MME/SGW/UDM/PCF/AMM/SMF/LMF/LMC 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility (AMF) functionality, and/or Session Management (SMF) functionality, Location Management Function (LMF), Location Management Component (LMC) and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF/LMF/LMC 190 is configurable to perform operations in accordance with example embodiments of the invention in any of an LTE, NR, 5G and/or any standards based communication technologies being performed or discussed at the time of this application.

The gNB 170 is coupled via a link 131 to the NCE/MME/SGW/UDM/PCF/AMM/SMF/LMF/LMC 190. The link 131 may be implemented as, e.g., an S1 interface or N2 interface. The NCE/MME/SGW/UDM/PCF/AMM/SMF/LMF/LMC 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF/LMF/LMC 190 to perform one or more operations. In addition, the NCE/MME/SGW/UDM/PCF/AMM/SMF/LMF/LMC 190, as are the other devices, is equipped to perform operations of such as by controlling the UE 110 and/or gNB 170 for 5G and/or NR operations in addition to any other standards operations implemented or discussed at the time of this application.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, gNB 170, and/or NCE/MME/SGW/UDM/PCF/AMM/SMF/LMF/LMC 190 as in FIG. 6.

It is noted that functionality(ies), in accordance with example embodiments of the invention, of any devices as shown in FIG. 6 e.g., the UE 110 and/or gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 6 at least via the wireless link 111 and/or via the NCE/MME/SGW/UDM/PCF/AMM/SMF/LMF/LMC 190 using link 199 to Other Network(s)/Internet as in FIG. 6.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Crystallization of the idea to solve the problems are described above can be as follows:

A procedure for the UE to determine the CORESETs in which the PDCCHs are monitored, where these CORESETs maybe with different QCL-TypeD and may be used for the PDCCH repetition operation (i.e., the same DCI is repeated via multiple SSSets which are associated with multiple CORESETs) is based on one or more of the following:

In an option (Option1), selecting $1^{st}$ CORESET based on Rel-15/Rel-16 mechanism and a $2^{nd}$ CORESET for PDCCH monitoring if the $1^{st}$ CORESET has linking with the $2^{nd}$ CORESET. Specifically:

Monitoring of the $2^{nd}$ CORESET can occur due to monitoring the $2^{nd}$ QCL-TypeD (e.g., at the UE $2^{nd}$ panel). If there is a linked CORESET for the $1^{st}$ CORESET which has been already selected, it will be tagged as $2^{nd}$ CORESET, No CORESET (with any other QCL-TypeD than selected QCL-TypeDs) without linking with the $1^{st}$ CORESET will be monitored by the UE, If there is linking between 1st and $2^{nd}$ CORESETs, both are monitored at the same time. Note that the linking of two CORESETs may result from two linked SS sets each of which corresponding to one CORESET, and/or Monitoring can also be extended to monitor any other CORESET from the multiple CORESETs that have been configured with $2^{nd}$ QCL-TypeD.

Further, in Option 1 there may be:

1). Linking of search space sets are configured by RRC (if the PDCCH repetition is supported to the UE). Each search space set is associated with a CORESET. So, the CORESET linking (max two CORESETs) can be derived. This is not novel part of the invention, and 2). In option 1, we define a rule to find two QCL-TypeDs using the linking of two CORESETs. In summary, we find first QCL-TypeD and the CORESETs associated with first QCL-TypeD. Then, we check whether there is a linking to one other CORESET with different QCL-TypeD within the CORESETs that having first QCL-TypeD. If yes, we start monitoring a second QCL type D in addition to a first QCL-TypeD.

It is noted that some novelty as seen in options of this paper are underlined and/or bolded in this paper.

A procedure for the UE to determine the CORESETs in which the PDCCHs are monitored, where these CORESETs maybe with different QCL-TypeD and may be used for the PDCCH repetition operation (i.e., the same DCI is repeated via multiple SSSets which are associated with multiple CORESETs) is based on one or more of the following below.

In a version of Option 1 there can be selecting 1st CORESET based on Rel-15/Rel-16 mechanism and a $2^{nd}$ CORESET for PDCCH monitoring if the $1^{st}$ CORESET has linking with the $2^{nd}$ CORESET. Specifically:

Monitoring of the $2^{nd}$ CORESET can occur due to monitoring the $2^{nd}$ QCL-TypeD (e.g., at the UE $2^{nd}$ panel). If there is a linked CORESET for the 1st CORESET which has been already selected, it will be tagged as $2^{nd}$ CORESET, No CORESET (with any other QCL-TypeD than selected QCL-TypeDs) without linking with the $1^{st}$ CORESET will be monitored by the UE, If there is linking between 1st and $2^{nd}$ CORESETs, both are monitored at the same time. Note that the linking of two CORESETs may result from two linked SS sets each of which corresponding to one CORESET, and/or Monitoring can also be extended to monitor any other CORESET from the multiple CORESETs that have been configured with $2^{nd}$ QCL-TypeD.

One example: The UE monitor 2 cells, each cell with 3 CORESETs, and CORESETs may have three QCL-TypeDs (#Q1, #Q2, #Q3). Assume that in cell 2, two CORESETs are linked. The CORESETs and QCL-TypeD relation can be denoted as:

CORESETs #1_1: QCL #Q1
CORESETs #1_2: QCL #Q3
CORESETs #1_3: QCL #Q3
CORESETs #2_1: QCL #Q1 (link)
CORESETs #2_2: QCL #Q2 (link)
CORESETs #2_3: QCL #Q2

Based on Rel-15, the UE may select CORESTE #1_1 as the QCL-type D to monitor, that means QCL #Q1. Further based on Rel-15, the UE monitor CORESETs #1_1 and CORESETs #2_1 as they have same QCL-TypeD. With the linking of CORESETs #2_1 and CORESETs #2_2, we also allow selecting a QCL-TypeD of the CORESET #2_2, which is QCL #Q2. After selection, the UE monitor all CORESETs of this second QCL-TypeD, that means it can also monitor CORESETs #2_2 and #2_3.

In an option (Option 2), there is selecting $1^{st}$ CORESET and $2^{nd}$ CORESET based on a new mechanism (not based on Rel-15/Rel-16) where the new mechanism allows PDCCH monitoring of linked CORESETs:

In other words, this option follows modifying the current Rel-15/Rel-16 rule via searching for CORESETs which always will be having linked SS sets (rather than monitoring lowest CSS index or lowest USS index in the cell with lowest index), The priority is given for monitoring CORESETs allowing the PDCCH repetition operation and is not based on CSS/USS index, If more than one cell is configured with PDCCH repetition operation, select the linked CORESETs in the cell with lower or higher index, The above new mechanism may only be applicable when the PDCCH repetition is configured to the UE, and/or If more than 2 linked CORESETs will be having linked SS sets, select the linked CORESETs with lower or higher index(es). Alternatively, select the linked CORESETs corresponding to the CSS/USS with higher or lower index(es).

In an option (Option 3), select 2nd CORESET with different QCL-TypeD than that of the first CORESET without considering the linking SS sets. In other words, monitoring different QCL-TypeD from different CORESETs is applied without necessarily considering if they are linked or not. Two sub-options are as follows:

In one sub-option, $1^{st}$ CORESET can be selected based on Rel-15/Rel-16 rules and select $2^{nd}$ CORESET with different QCL-TypeD than the $1^{st}$ CORESET's QCL-TypeD based on extending the Rel-15/Rel-16 rule by considering only the CORESETs associated with linked SS sets where CSS/USS IDs are not associated with the first (selected) CORESET QCL-TypeD;

In one sub-option, 1$^{st}$ CORESET can be selected based on Rel 15/16 rules and select 2$^{nd}$ CORESET only among the linked SS sets:
  If the 1$^{st}$ selected CORESET corresponds to a CSS set(s) (or USS set(s)), the 2$^{nd}$ CORESET selection can be based on Rel15/16 rule,
  If the 1$^{st}$ monitored CORESET corresponds to a USS set(s) (or CSS set(s)) the 2$^{nd}$ CORESET can be selected (among the linked SS sets) from the CORESETs linked to the 1$^{st}$ CORESET, and/or
  If more than 2 linked CORESETs are selected as 2$^{nd}$ CORESET (based on the above rule), select the CORESET with lower/higher index. Alternatively, select the CORESET corresponding to CSS/USS with higher/lower index.

Further, option 3 is trying to cover a scenario of selecting of two QCL-TypeDs from different CORESETs, where this selection may be defined to follow a general principle and does not fully depend on the use case (e.g., PDCCH repetition, multi-DCI reception). This can be without necessarily considering if they are linked or not. For example, 1$^{st}$ CORESET can be selected based on Rel-15/Rel-16 rules and select 2$^{nd}$ CORESET with different QCL-TypeD than the 1$^{st}$ CORESET's QCL-TypeD based on extending the Rel-15/Rel-16.

In Option 3, A general principle is used to select 2nd CORESET with different QCL-TypeD than that of the first CORESET without considering the supported use case. In other words, monitoring different QCL-TypeD from different CORESETs is applied without necessarily considering if they are linked or not (or without any dependence on a use case).

In one variant, 1$^{st}$ CORESET can be selected based on Rel-15/Rel-16 rules and select 2$^{nd}$ CORESET with different QCL-TypeD than the 1$^{st}$ CORESET's QCL-TypeD based on extending the Rel-15/Rel-16 rule by considering the CORESETs which are not associated with the first (selected) CORESET QCL-TypeD.

With this, the gNB may select RRC configuration of CSS/USS set(s) and CORESETs to make sure that the UE uses defined principle to select 1$^{st}$ and 2$^{nd}$ QCL-TypeD also for PDCCH repetition.

In another variant, some extra restrictions for selection may be defined at the UE side to support different use cases:
  To support PDCCH repetition, select 2$^{nd}$ CORESET with different QCL-TypeD than the 1$^{st}$ CORESET's QCL-TypeD based on extending the Rel-15/Rel-16 rule by considering only the CORESETs associated with linked SS sets where CSS/USS IDs are not associated with the first (selected) CORESET QCL-TypeD, and/or
  To support multi-DCI multi-TRP operation, select 2$^{nd}$ CORESET with different QCL-TypeD than the 1$^{st}$ CORESET's QCL-TypeD based on extending the Rel-15/Rel-16 rule by considering the CORESETs with different CORESETPoolIndex (CORESET group that defined to support m-DCI) and which are not associated with the first (selected) CORESET QCL-TypeD.

The following examples illustrate the multiple options in accordance with example embodiments of the invention.

Figure 2:
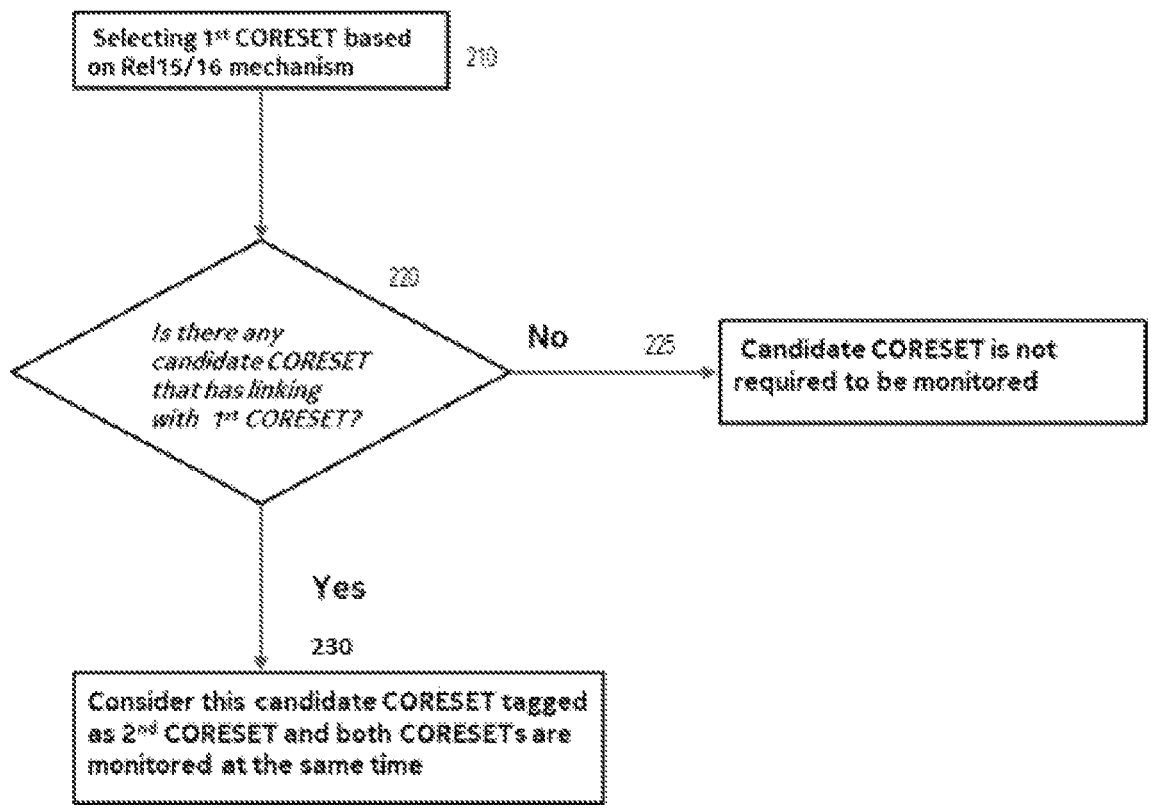
FIG. 2 shows an example of monitoring overlapping CORESETs with different QCL-TypeD with PDCCH repetition based on linkage in accordance with example embodiments of the invention.

FIG. 2 shows an example of monitoring overlapping CORESETs with different QCL-TypeD with PDCCH repetition based on linkage in accordance with example embodiments of the invention.

FIG. 2 depicts an example of using Option 1 when the 'prioritization' of 2 CORESETs (with 2 different QCL-TypeD) are monitored based on their linkage.

As shown in step 210 of FIG. 2 there is selecting 1$^{st}$ CORESET based on Rel-15/Rel-16 mechanism. As shown in step 220 of FIG. 2 there is determining if there is any candidate coreset that has linking with 1$^{st}$ CORESET. If no to step 220, then as shown in step 225 of FIG. 2 then candidate CORESET is not required to be monitored. If yes to step 220, then as shown in step 230 there is considering this candidate coreset tagged as 2$^{nd}$ CORESET and both CORESETs are monitored at same time.

When Rel-15/Rel-16 rule is utilized above for 1$^{st}$ CORESET selection, following procedure is employed:
  "UE monitors PDCCH candidates in overlapping PDCCH monitoring occasions in multiple CORESETs that have same or different QCL-TypeD properties on active DL BWP(s) of one or more cells.
    the UE monitors PDCCHs only in a CORESET, and in any other CORESET from the multiple CORESETs having same QCL-TypeD properties as the CORESET, on the active DL BWP of a cell from the one or more cells,
    the CORESET corresponds to the CSS set with the lowest index in the cell with the lowest index containing CSS, if any; otherwise, to the USS set with the lowest index in the cell with lowest index:
      the lowest USS set index is determined over all USS sets with at least one PDCCH candidate in overlapping PDCCH monitoring occasions"

Figure 3:
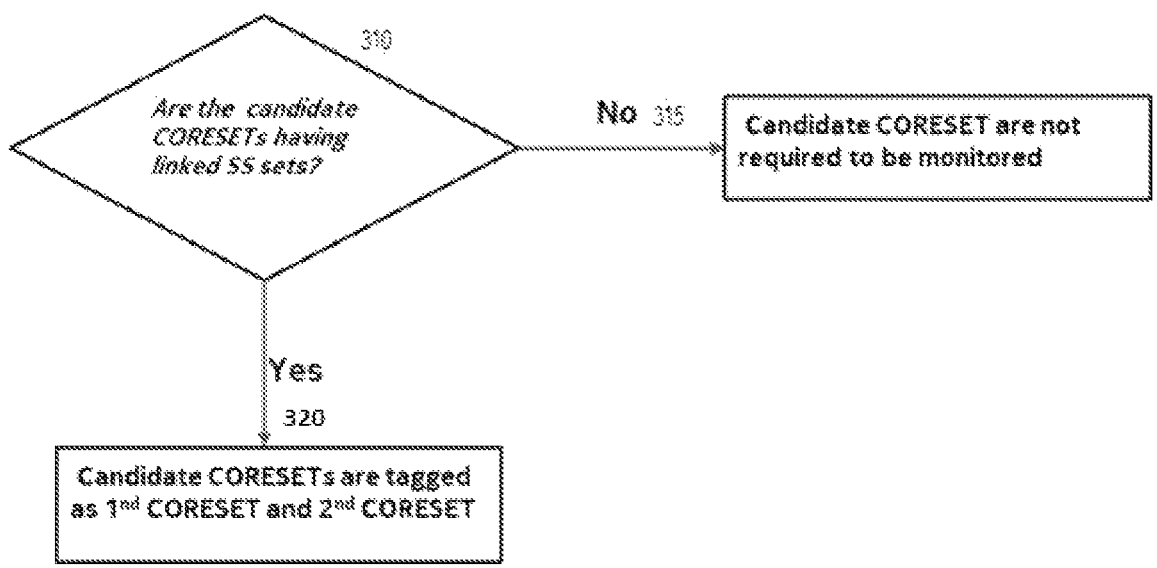
FIG. 3 shows an example of monitoring overlapping CORESETs with different QCL-TypeD with PDCCH repetition based on SS sets which are linked among other SS sets in accordance with example embodiments of the invention.

FIG. 3 shows an example of monitoring overlapping CORESETs with different QCL-TypeD with PDCCH repetition based on SS sets which are linked among other SS sets in accordance with example embodiments of the invention.

FIG. 3 depicts an example of using Option 2 when the prioritization of 2 CORESETs (with 2 different QCL-TypeD) are monitored based on modifying the current Rel-15/Rel-16 rule for the repetition of linked SS sets of 2 CORESETs. As such, monitoring CORESETs allowing the PDCCH repetition operation will not be based on monitoring lowest CSS/USS index as implemented in Rel-15/16.

As shown in step 310 of FIG. 3 there is determining whether candidates have linked SS sets. If the answer to step 310 is no, then as shown in step 315 of FIG. 3 the candidate CORESET(s) is not required to be monitored. If the answer to step 310 is yes, then as shown in step 320 of FIG. 3 there is tagging candidate CORESET(s) as 1$^{st}$ CORESET and 2$^{nd}$ CORESET.

Figure 4:
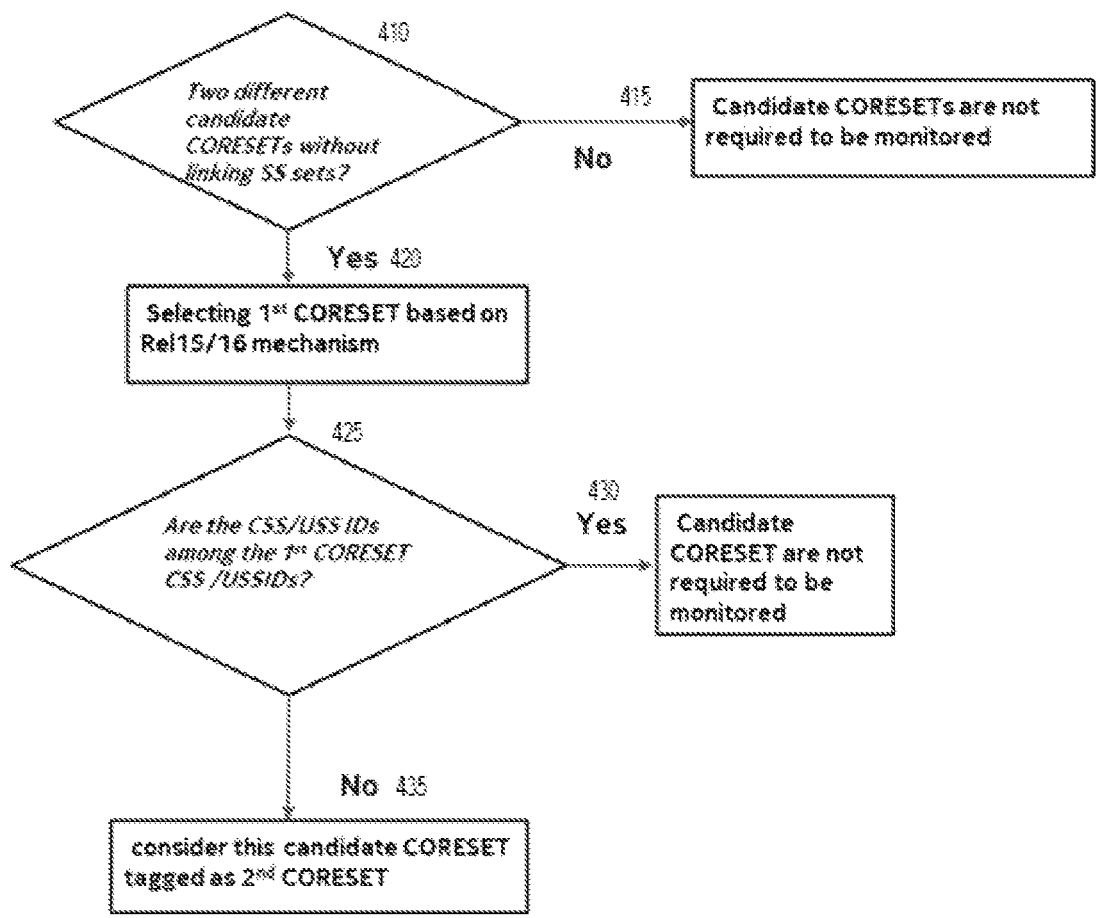
FIG. 4 shows an example of monitoring overlapping CORESETs with different QCL-TypeD with PDCCH repetition and CSS/USS IDs are not associated with the first (selected) CORESET QCL-TypeD in accordance with example embodiments of the invention.

FIG. 4 shows an example of monitoring overlapping CORESETs with different QCL-TypeD with PDCCH repetition and CSS/USS IDs are not associated with the first (selected) CORESET QCL-TypeD in accordance with example embodiments of the invention.

FIG. 4 depicts an example of using Option3 (first sub-option) when the prioritization of 2 CORESETs (with 2 different QCL-TypeD) are monitored based on not considering the linking SS sets where only the CSS/USS IDs not associated with CSS/USS IDs of the first selected CORESET QCL-TypeD are selected for the 2$^{nd}$ CORESET. As an example, the 1$^{st}$ CORESET will be selected based on Rel-15/Rel-16 rule and 2$^{nd}$ CORESET is selected among the CORESETs associated with linked SS sets where its CSS/USS IDs not associated with the first (selected) CORESET QCL-TypeD.

As shown in step 410 of FIG. 4 there is determining whether there are two different candidate CORESETs without linking SS sets. If the answer to step 410 is no, then as shown in step 415 of FIG. 4 the candidate CORESETs are not required to be monitored. If the answer to step 410 is yes, then as shown in step 420 of FIG. 4 there is selecting 1$^{st}$ CORESET based on Rel-15/Rel-16 mechanism. As shown in step 425 of FIG. 4 there is determining whether there are CSS/USS IDs among the 1$^{st}$ CORESET CSS/USS IDs. If the answer to step 425 is yes, then as shown in step 430 of FIG. 4 the candidate CORESET are not required to be monitored. If the answer to step 425 is no, then as shown in step 435 of FIG. 4 there is considering this candidate CORESET tagged as 2$^{nd}$ CORESET.

Figure 5:
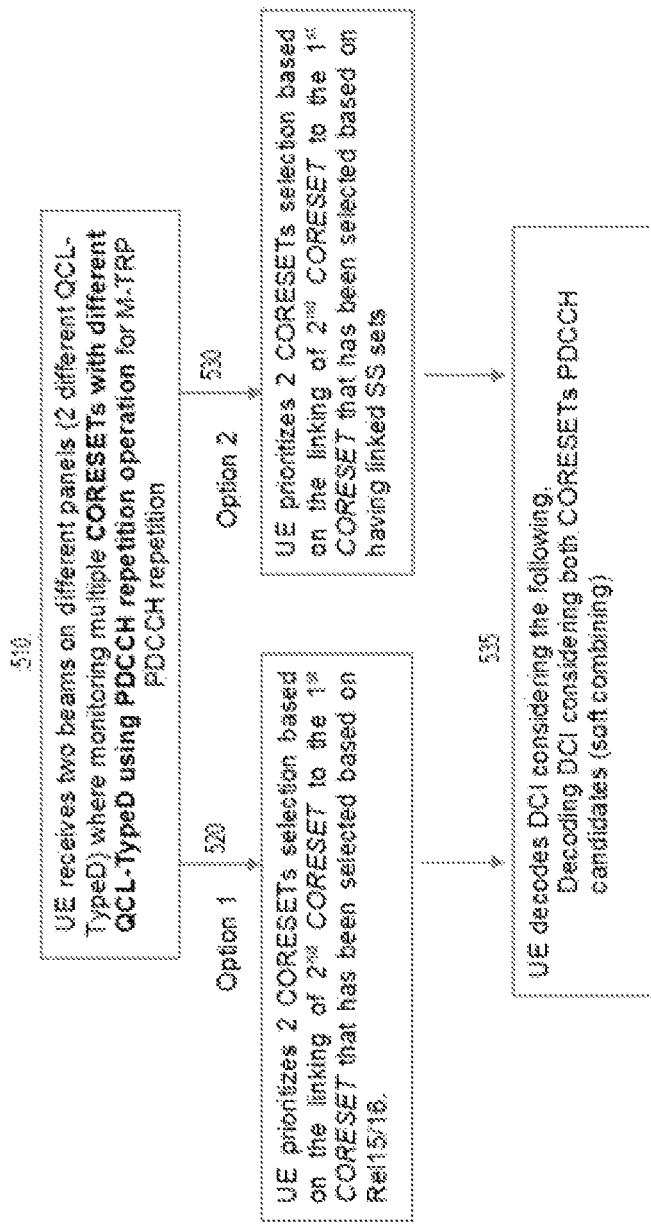
FIG. 5 shows flow diagram illustrating the UE operation considering 2 discussed options for PDCCH repetition with multiple overlapping CORESETs with different QCL-TypeD in accordance with example embodiments of the invention.

Example flow diagram illustrating the UE operation considering 2 discussed options for PDCCH repetition with multiple overlapping CORESETs with different QCL-TypeD is shown as in FIG. 5.

FIG. 5 shows a flow diagram illustrating the UE operation considering 2 discussed options for PDCCH repetition with multiple overlapping CORESETs with different QCL-TypeD in accordance with example embodiments of the invention.

As shown in step 510 of FIG. 5 there a UE receives two beams on different panels (2 different QCL-TypeD) where monitoring multiple coresets with different QCL-TypeD using PDCCH repetition operation for M-TRP PDCCH repetition. As shown in Option 1 step 520 of FIG. 5 the UE prioritizes 2 CORESETs selection based on linking of 2$^{nd}$ CORESET to a 1$^{st}$ CORESET that has been selected based on Rel-15/Rel-16. As shown in Option 2 step 530 of FIG. 5 the UE prioritizes 2 CORESETs selection based on linking of 2$^{nd}$ CORESET that has been selected based on having linked SS sets. Then as shown in step 535 of FIG. 5 the UE decodes DCI considering decoding DCI considering both CORESETs PDCCH and candidates (soft combining).

Figure 7:
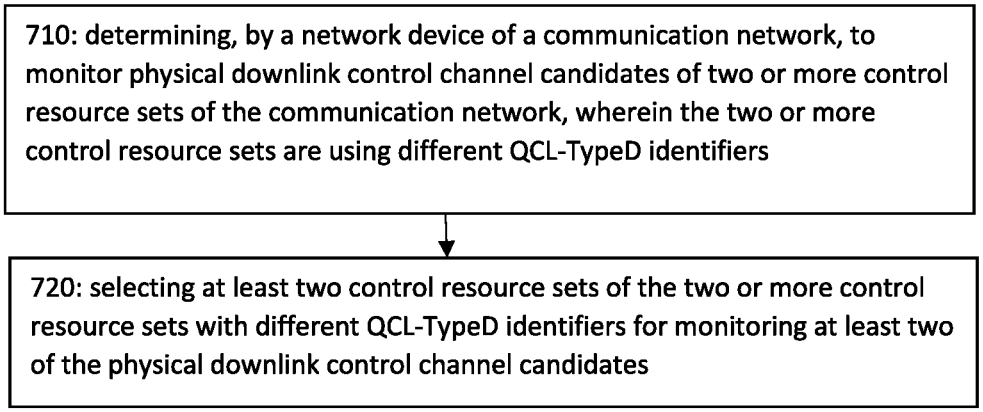
FIG. 7 shows a method in accordance with example embodiments of the invention which may be performed by an apparatus.

FIG. 7 shows a method in accordance with example embodiments of the invention which may be performed by an apparatus.

FIG. 7 illustrates operations which may be performed by a device such as, but not limited to, a device (e.g., the eNB/gNB 170 as in FIG. 6). As shown in step 710 of FIG. 7 there is determining, by a network device of a communication network, to monitor physical downlink control channel candidates of two or more control resource sets of the communication network, wherein the two or more control resource sets are using different QCL-TypeD. Then as shown in step 720 of FIG. 7 there is selecting at least two control resource sets of the two or more control resource sets with different QCL-TypeD for monitoring at least two of the physical downlink control channel candidates.

In accordance with the example embodiments as described in the paragraph above, wherein the selecting comprises selecting at least two control resource sets with different QCL-TypeD associated with physical downlink control channel repetitions.

In accordance with the example embodiments as described in the paragraphs above, wherein the two or more control resource sets comprises at least a first control resource set and at least one other control resource set.

In accordance with the example embodiments as described in the paragraphs above, wherein the selecting further comprises: selecting the first control resource set and the at least one other control resource set of the two or more control resource sets for monitoring based on a linking between the first control resource set and the at least one other control resource set.

In accordance with the example embodiments as described in the paragraphs above, wherein the linking between the first control resource set and the at least one other control resource set comprises search space sets of the first control resource set and the at least one other control resource set being linked.

In accordance with the example embodiments as described in the paragraphs above, wherein the monitoring comprises monitoring physical downlink control channel candidates of the at least one other control resource set associated with a second QCL-TypeD.

In accordance with the example embodiments as described in the paragraphs above, wherein the monitoring is extended to monitor any control resource set of the at least one other control resource set having the same QCL-TypeD as the second QCL-TypeD.

In accordance with the example embodiments as described in the paragraphs above, wherein the monitoring is not performed on control resource sets of the two or more control resource sets which are not linked with the first control resource set.

In accordance with the example embodiments as described in the paragraphs above, wherein based on there being more than two control resource sets having linked search space sets the selecting comprises selecting linked control resource sets with one of lowest or highest indexes.

In accordance with the example embodiments as described in the paragraphs above, wherein a priority is given for monitoring control resource sets allowing physical downlink control channel repetition that is not based on at least one of common search space or UE-Specific Search Space indexes.

In accordance with the example embodiments as described in the paragraphs above, wherein based on more than one cell being configured with physical downlink control channel repetition the selecting comprises linked control resource sets in a cell with one of lower or higher indexes.

In accordance with the example embodiments as described in the paragraphs above, wherein the monitoring comprises monitoring the different QCL-TypeD from different control resource sets of the two or more control resource sets without consideration of whether the different control resource sets are linked to each other.

In accordance with the example embodiments as described in the paragraphs above, wherein the selecting comprises selecting a first control resource set with a first QCL-TypeD and selecting a second control resource set with a different QCL-TypeD based on control resource sets not associated with the first QCL-TypeD.

In accordance with the example embodiments as described in the paragraphs above, wherein the selecting is using restrictions to support at least one of physical downlink control channel repetition or multi-transmission and reception point operations.

In accordance with the example embodiments as described in the paragraphs above, wherein the restrictions are considering control resource sets with a different coreset pool index associated with a control resource set group defined to support multi-downlink-control-information mode.

A non-transitory computer-readable medium (Memory (ies) 155 of FIG. 6) storing program code (Computer Program Code 153 and/or Selection Module 150-2 as in FIG. 6), the program code executed by at least one processor (Processor(s) 120 and/or Selection Module 150-1 as in FIG. 6) to perform the operations as at least described in the paragraphs above.

In accordance with an example embodiment of the invention as described above there is an apparatus comprising:

means for determining (one or more transceivers 160, Memory(ies) 155, Computer Program Code 153 and/or Selection Module 150-2, and Processor(s) 120 and/or Selection Module 150-1 as in FIG. 6), to monitor physical downlink control channel candidates of two or more control resource sets of the communication network, wherein the two or more control resource sets are using different QCL-TypeD, wherein the two or more control resource sets are using different QCL-TypeD; and means for selecting (one or more transceivers 160, Memory(ies) 155, Computer Program Code 153 and/or Selection Module 150-2, and Processor(s) 120 and/or Selection Module 150-1 as in FIG. 6) at least two control resource sets of the two or more control resource sets with different QCL-TypeD for monitoring at least two of the physical downlink control channel candidates.

In the example aspect of the invention according to the paragraph above, wherein at least the means for determining and selecting comprises a non-transitory computer readable medium [Memory(ies) 155 as in FIG. 6] encoded with a computer program [Computer Program Code 153 and/or Selection Module 150-2 as in FIG. 6] executable by at least one processor [Processor(s) 152 and/or Selection Module 150-1 as in FIG. 6].

It is submitted that advantages of example embodiments of the invention as disclosed herein include:
  Extending CORESET QCL-TypeD selection rules when PDCCH repetition is employed,
  Cover Rel15/16 framework for monitoring multiple overlapping CORESETs, and
  Employing a set of assumptions to identify QCL-TypeD priority rules when UE receives two different beams at 2 different panels beam changes applied.

In accordance with example embodiments of the invention as disclosed in this application this application, the "circuitry" provided can include at least one or more or all of the following:
  (a) hardware-only circuit implementations (such as implementations in only analog and/or digital circuitry);
  (b) combinations of hardware circuits and software, such as (as applicable):
     (i) a combination of analog and/or digital hardware circuit(s) with software/firmware; and
     (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
  (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:
  (a) hardware-only circuit implementations (such as implementations in only analog and/or digital circuitry); and
  (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
  (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one memory storing instructions that, when executed by the at least one processor, cause the apparatus to at least:
      determine to monitor physical downlink control channel candidates of two or more control resource sets of a communication network, wherein the two or more control resource sets are using different quasi co-location types associated with one or more spatial receiver parameters (QCL-TypeD);
      determine whether there are at least two linked control resource sets from the two or more control resource sets;
      determine that the physical downlink control channel candidates of the two or more control resource sets are not monitored based, at least partially, on a determination that there is not the at least two linked control resource sets; and
      select a first control resource set and at least one other control resource set of the at least two linked control resource sets in a cell for monitoring based, at least partially, on a determination that there are the at least two linked control resource sets,
      wherein the first control resource set and the at least one other control resource set are selected in a cell with one of lowest or highest index based, at least partially, on more than one cell being configured with physical downlink control repetition, and
      wherein the first control resource set and the at least one other control resource set comprise linked control resource sets with a lowest or highest index based, at least partially, on a determination that the two or more control resource sets comprise more than two linked control resource sets.

2. The apparatus of claim 1, wherein the first control resource set and the at least one other control resource set are associated with different QCL-TypeD associated with physical downlink control channel repetitions.

3. The apparatus of claim 1, wherein the monitoring comprises monitoring physical downlink control channel candidates of the at least one other control resource set associated with a second QCL-TypeD.

4. The apparatus of claim 3, wherein the monitoring is extended to monitor any control resource set of the at least one other control resource set having the same QCL-TypeD as the second QCL-TypeD.

5. The apparatus of claim 1, wherein the monitoring is not performed on control resource sets of the two or more control resource sets which are not linked with the first control resource set.

6. The apparatus of claim 1, wherein a priority is given for monitoring control resource sets allowing physical downlink control channel repetition that is not based on at least one of common search space or user equipment specific search space indexes.

7. The apparatus of claim 1, wherein the first control resource set is selected based, at least partially, on the first control resource set having a first QCL-TypeD, and the at least one other control resource set is selected based, at least partially, on the at least one other control resource set having a different QCL-TypeD based on control resource sets not associated with the first QCL-TypeD.

8. The apparatus of claim 1, wherein selecting the first control resource set and the at least one other control resource set comprises the instructions, when executed by the at least one processor, cause the apparatus to:
   use restrictions to support at least one of physical downlink control channel repetition or multi-transmission and reception point operations.

9. The apparatus of claim 1, wherein the apparatus comprises a user equipment or is comprised in a user equipment.

10. A method comprising:
    determining to monitor physical downlink control channel candidates of two or more control resource sets of a communication network, wherein the two or more control resource sets are using different quasi colocation types associated with one or more spatial receiver parameters (QCL-TypeD);
    determining whether there are at least two linked control resource sets from the two or more control resource sets;
    determining that the physical downlink control channel candidates of the two or more control resource sets are not monitored based, at least partially, on a determination that there is not the at least two linked control resource sets; and
    selecting a first control resource set and at least one other control resource set of the at least two linked control resource sets in a cell for monitoring based, at least partially, on a determination that there are the at least two linked control resource sets,
    wherein the first control resource set and the at least one other control resource set are selected in a cell with one of lowest or highest index based, at least partially, on more than one cell being configured with physical downlink control repetition, and
    wherein the first control resource set and the at least one other control resource set comprise linked control resource sets with a lowest or highest index based, at least partially, on a determination that the two or more control resource sets comprise more than two linked control resource sets.

11. The method of claim 10, wherein the first control resource set and the at least one other control resource set are associated with different QCL-TypeD associated with physical downlink control channel repetitions.

12. A non-transitory computer readable medium comprising program instructions stored thereon for performing at least:
    determining to monitor physical downlink control channel candidates of two or more control resource sets of a communication network, wherein the two or more control resource sets are using different quasi colocation types associated with one or more spatial receiver parameters (QCL-TypeD);
    determining whether there are at least two linked control resource sets from the two or more control resource sets;

determining that the physical downlink control channel candidates of the two or more control resource sets are not monitored based, at least partially, on a determination that there is not the at least two linked control resource sets; and selecting a first control resource set and at least one other control resource set of the at least two linked control resource sets in a cell for monitoring based, at least partially, on a determination that there are the at least two linked control resource sets, wherein the first control resource set and the at least one other control resource set are selected in a cell with one of lowest or highest index based, at least partially, on more than one cell being configured with physical downlink control repetition, and wherein the first control resource set and the at least one other control resource set comprise linked control resource sets with a lowest or highest index based, at least partially, on a determination that the two or more control resource sets comprise more than two linked control resource sets.

13. The method of claim 10, wherein the monitoring comprises monitoring physical downlink control channel candidates of the at least one other control resource set associated with a second QCL-TypeD.

14. The method of claim 13, wherein the monitoring is extended to monitor any control resource set of the at least one other control resource set having the same QCL-TypeD as the second QCL-TypeD.

15. The method of claim 10, wherein the monitoring is not performed on control resource sets of the two or more control resource sets which are not linked with the first control resource set.

16. The method of claim 10, wherein the first control resource set and the at least one other control resource set are selected based, at least partially, on the first control resource set and the at least one other control resource set comprising linked control resource sets with one of lowest or highest indexes.

17. The method of claim 16, wherein a priority is given for monitoring control resource sets allowing physical downlink control channel repetition that is not based on at least one of common search space or user equipment specific search space indexes.

* * * * *